US012656753B2

(12) United States Patent

Arrfou et al.

(10) Patent No.: US 12,656,753 B2

(45) Date of Patent: Jun. 16, 2026

(54) CLUSTERING AND DETECTION SYSTEM AND METHOD FOR SAFETY MONITORING IN A COLLABORATIVE WORKSPACE

(71) Applicant: Datalogic IP Tech S.r.l., Lippo di Calderara di Reno (IT)

(72) Inventors: Mohammad Arrfou, Bologna (IT); Gildo Andreoni, Fanano (IT); Claudio Saporetti, Bologna (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 824 days.

(21) Appl. No.: 17/811,281

(22) Filed: Jul. 7, 2022

(65) Prior Publication Data

US 2024/0012383 A1 Jan. 11, 2024

(51) Int. Cl.
G05B 19/4063 (2006.01)
G06T 7/20 (2017.01)
(Continued)

(52) U.S. Cl.
CPC ............ G05B 19/4063 (2013.01); G06T 7/20 (2013.01); G06T 7/70 (2017.01); G06V 10/22 (2022.01);
(Continued)

(58) Field of Classification Search
CPC ...... G05B 19/4063; G05B 2219/34465; G05B 2219/39091; G05B 2219/40202;
(Continued)

(56) References Cited

U.S. PATENT DOCUMENTS 9,251,598 B2 2/2016 Wells et al.
10,444,759 B2 10/2019 Douillard et al.
(Continued)

FOREIGN PATENT DOCUMENTS

EP 2023160 B1 8/2007
EP 2819109 A1 12/2014
(Continued)

OTHER PUBLICATIONS

Zanchettin et al (Safety in Human-Robot Collaborative Manufacturing Environments: Metrics and Control), 2016, pp. 882-893, downloaded from https://ieeexplore.ieee.org/abstract/document/7079531 (Year: 2016).*

(Continued)

*Primary Examiner* — Robert E Fennema
*Assistant Examiner* — Olvin Lopez Alvarez
(74) *Attorney, Agent, or Firm* — Stoel Rives LLP

(57) ABSTRACT

The disclosure relates to systems and methods for ensuring human safety in a workspace shared with a robot or other dangerous machinery. The system includes one or more sensors arranged to monitor the workspace. Data from each of the sensors is acquired and analyzed to determine the positioning and spatial relationship between the human and machine, along with any respective objects that either or both may be carrying as they each move throughout the workspace. The captured data is analyzed to mitigate potential collisions between the human and the machine in the workspace, including potential collisions that may be caused by the respective objects carried by the human or machine.

19 Claims, 10 Drawing Sheets

(51) Int. Cl.

| | |
|---|---|
| *G06T 7/70* | (2017.01) |
| *G06V 10/22* | (2022.01) |
| *G06V 10/762* | (2022.01) |
| *G06V 20/52* | (2022.01) |
| *G08B 21/02* | (2006.01) |

(52) U.S. Cl.

CPC ............ *G06V 10/762* (2022.01); *G06V 20/52* (2022.01); *G05B 2219/34465* (2013.01); *G06T 2207/30164* (2013.01); *G06T 2207/30232* (2013.01); *G08B 21/02* (2013.01)

(58) Field of Classification Search

CPC ........... G05B 2219/40203; G05B 2219/40442; G06T 7/20; G06T 7/70; G06T 2207/30164; G06T 2207/30232; G06V 10/22; G06V 10/762; G06V 20/52; G08B 21/02; F16P 3/142; F16P 3/147; B25J 9/1674; B25J 9/1676

See application file for complete search history.

(56) References Cited

U.S. PATENT DOCUMENTS

| | | | |
|---|---|---|---|
| 11,110,605 | B2 | 9/2021 | Zanchettin et al. |
| 11,675,329 | B2 * | 6/2023 | Pritchard ............... B25J 9/1676 |
| | | | 700/28 |
| 11,717,964 | B2 | 8/2023 | Muneto et al. |
| 12,202,146 | B2 | 1/2025 | Lin et al. |
| 2003/0216822 | A1 | 11/2003 | Sato |
| 2011/0032341 | A1 | 2/2011 | Ignatov et al. |
| 2013/0117420 | A1 * | 5/2013 | Han ...................... H04W 40/32 |
| | | | 709/220 |
| 2014/0277723 | A1 | 9/2014 | Nishimura et al. |
| 2016/0214255 | A1 | 7/2016 | Uhlenbrock et al. |
| 2018/0157230 | A1 | 6/2018 | Matsushima |
| 2018/0222050 | A1 | 8/2018 | Vu et al. |
| 2018/0222051 | A1 | 8/2018 | Vu et al. |
| 2018/0222052 | A1 | 8/2018 | Vu et al. |
| 2018/0364717 | A1 | 12/2018 | Douillard et al. |
| 2019/0105779 | A1 | 4/2019 | Einav |
| 2019/0351552 | A1 | 11/2019 | He et al. |
| 2020/0073358 | A1 | 3/2020 | Dedkov et al. |
| 2020/0078948 | A1 | 3/2020 | Krause et al. |
| 2020/0206928 | A1 | 7/2020 | Denenberg et al. |
| 2020/0290205 | A1 | 9/2020 | Hammes et al. |
| 2020/0331146 | A1 | 10/2020 | Vu et al. |
| 2020/0331155 | A1 | 10/2020 | Vu et al. |
| 2020/0398433 | A1 | 12/2020 | Kelly et al. |
| 2021/0053224 | A1 | 2/2021 | Schroeder et al. |
| 2021/0053227 | A1 | 2/2021 | Wartenberg et al. |
| 2021/0146546 | A1 * | 5/2021 | Linkowski ............. B25J 9/1676 |
| 2021/0260770 | A1 | 8/2021 | Vu et al. |
| 2021/0370510 | A1 | 12/2021 | Mao et al. |

| | | | |
|---|---|---|---|
| 2022/0176560 | A1 | 6/2022 | Akagi et al. |
| 2022/0407878 | A1 * | 12/2022 | Harris ................. H04L 63/1425 |
| 2023/0100085 | A1 | 3/2023 | Sugio et al. |
| 2023/0196495 | A1 | 6/2023 | Andreoni et al. |
| 2023/0202031 | A1 * | 6/2023 | Yang ................... G06V 10/764 |
| | | | 700/259 |
| 2023/0202037 | A1 | 6/2023 | Andreoni et al. |
| 2024/0193788 | A1 | 6/2024 | Tang et al. |
| 2024/0362860 | A1 | 10/2024 | Teranishi et al. |

FOREIGN PATENT DOCUMENTS

| | | | |
|---|---|---|---|
| EP | 1635107 B2 | 1/2016 | |
| EP | 3654125 A1 | 5/2020 | |
| WO | WO-2015049207 A2 * | 4/2015 | ........... B25J 9/1666 |
| WO | 2018131237 A1 | 7/2018 | |
| WO | 2018192657 A1 | 10/2018 | |

OTHER PUBLICATIONS

Marco Costanzo et al, "A Multimodal Approach to Human Safety in Collaborative Robotic Workcells", Apr. 2022, pp. 1202-1216, downloaded from https://ieeexplore.ieee.org/abstract/document/9314214 (Year: 2022).*

Nicola Pedrocchi et al, "Safe Human-Robot Cooperation in an Industrial Environment", 2013, pp. 1-13, downloaded from https://journals.sagepub.com/doi/full/10.5772/53939 (Year: 2013).*

Andrea Maria Zanchettin et al, "Safety in Human-Robot Collaborative Manufacturing Environments: Metrics and Control", Apr. 2016 , pp. 882-893, downloaded from https://ieeexplore.ieee.org/abstract/document/7079531 (Year: 2016).*

European Patent Office, Extended European Search Report in European Patent Application No. 22216742.1, mailed May 24, 2023, 9 pages.

European Patent Office, Extended European Search Report in European Patent Application No. 22215564.0, mailed Sep. 19, 2023, 16 pages.

European Patent Office, Extended European Search Report in European Patent Application No. 23183057.1, mailed Dec. 22, 2023, 11 pages.

Miseikis et al, "Multi 3D Camera Mapping for Predictive and Reflexive Robot Manipulator Trajectory Estimation", Cornell University Library, Oct. 12, 2016, XP081152218, DOI: 10.1109/SSCI.2016.7850237. 8 pages.

Ebert et al. "Safe Human-Robot-Cooperation: Problem Analysis, System Concept and Fast Sensor Fusion", Embedded Systems and Robotics Lab (RESY) at the University of Kaiserslautern, Germany, Aug. 20-22, 2001, 6 pages.

Flacco et al. "A Depth Space Approach to Human-Robot Collision Avoidance", IEEE International Conference on Robotics and Automation, May 14-18, 2012, 8 pages.

Sobalvarro, Patrick, A Closer Look at a Safety-Certified Vision System for Human-Robot Collaboration, International Robot Safety Conference, Sep. 22, 2021, 18 pages.

\* cited by examiner

300

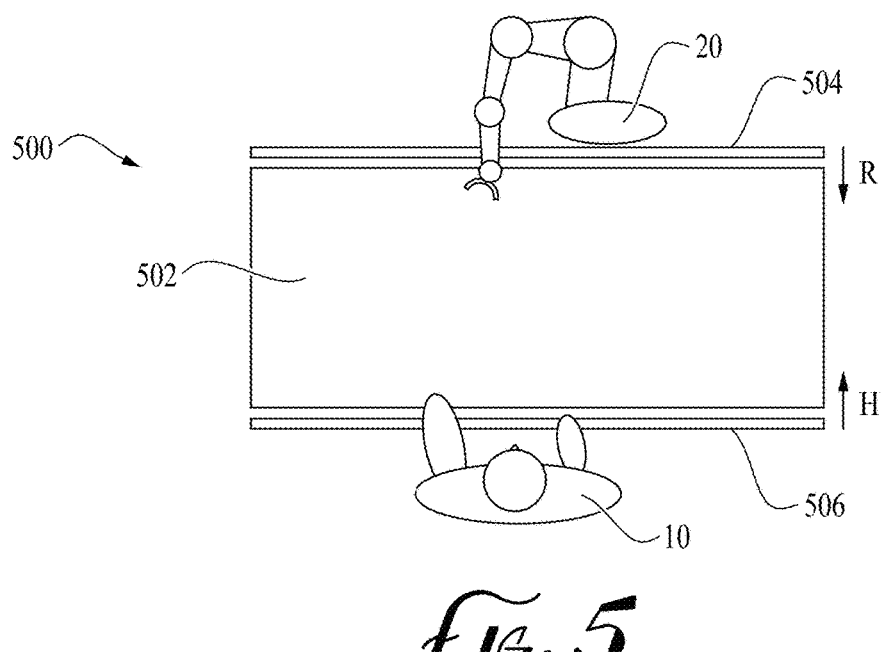
*fig.5*
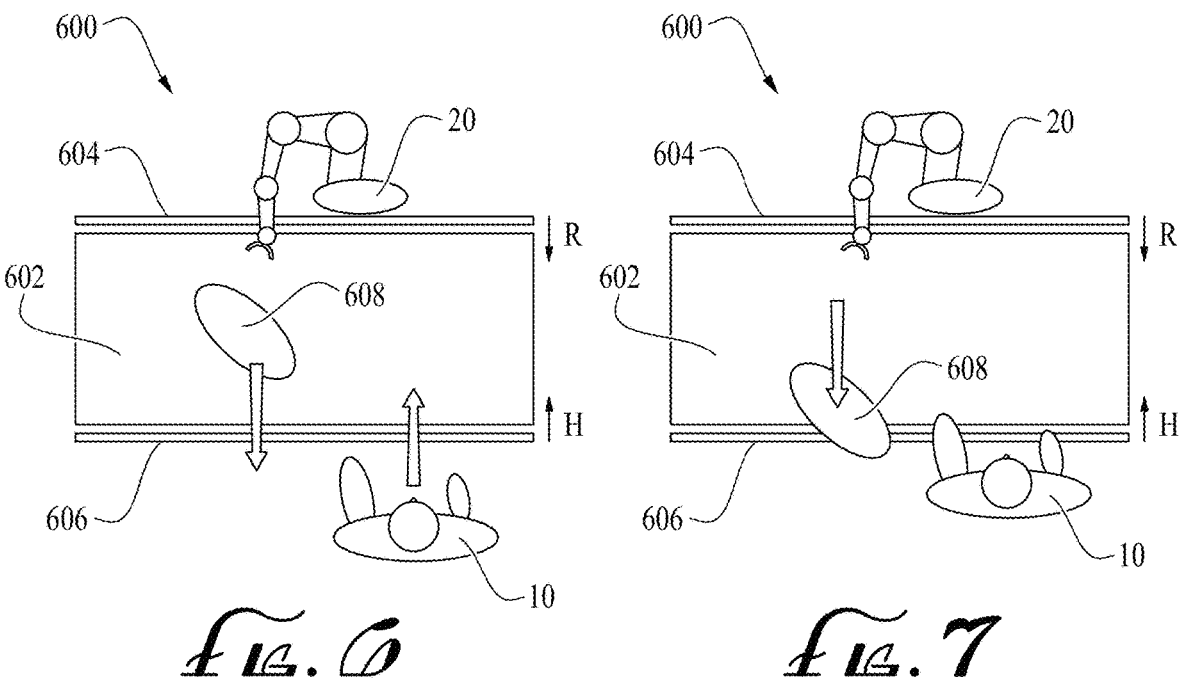
*fig.6*                      *fig.7*

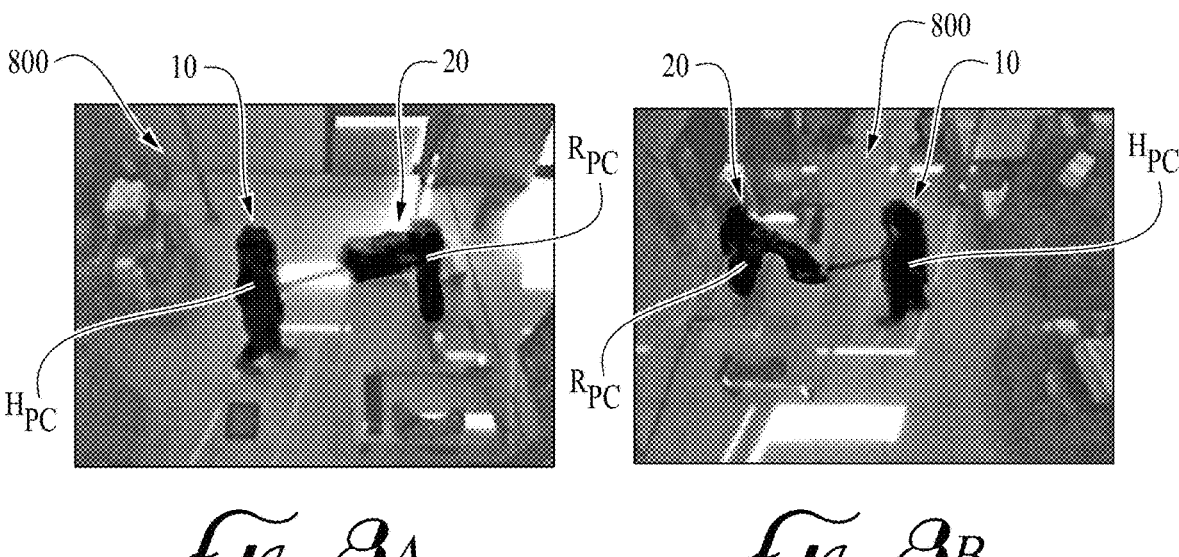
*FIG. 8A*         *FIG. 8B*
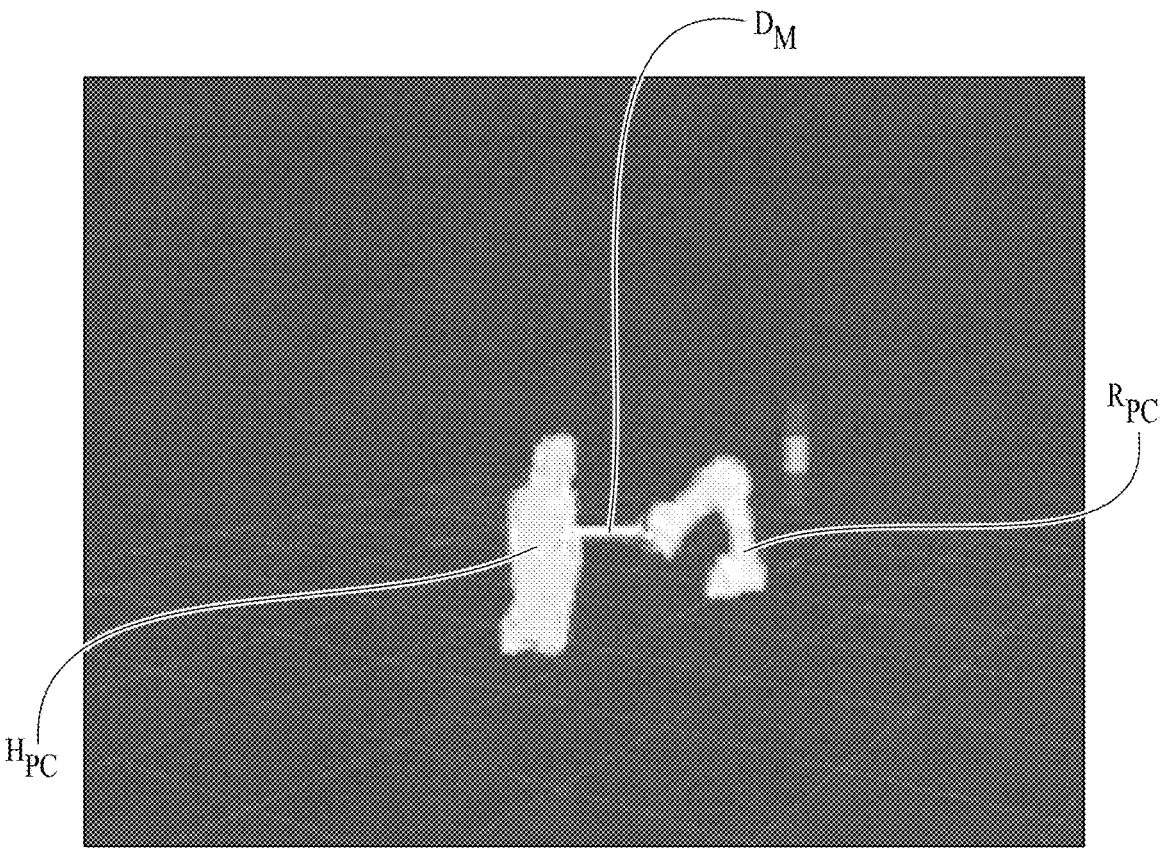
*FIG. 8C*

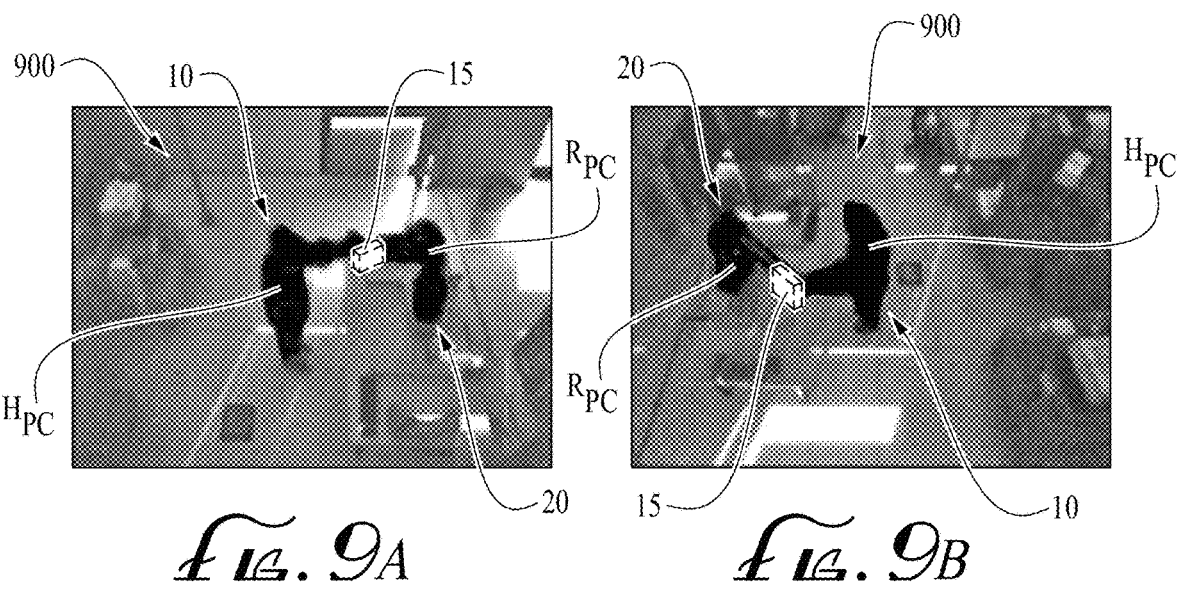
*fig. 9A*  *fig. 9B*
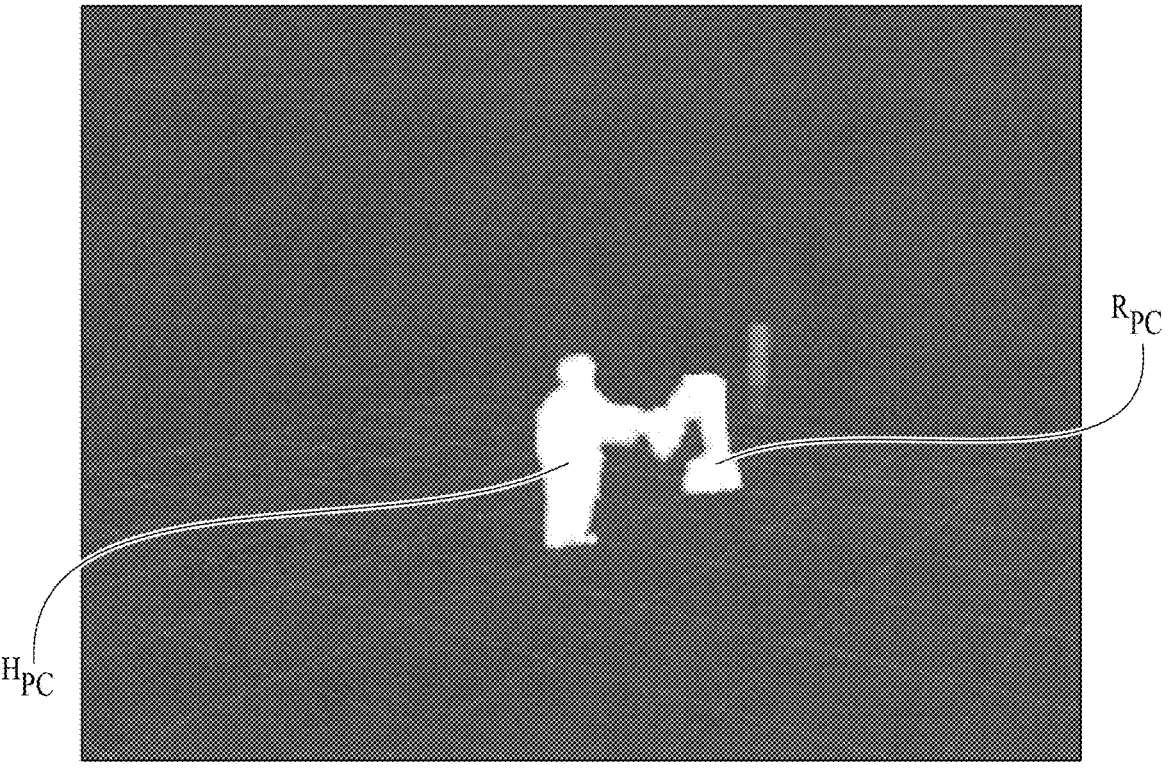
*fig. 9C*

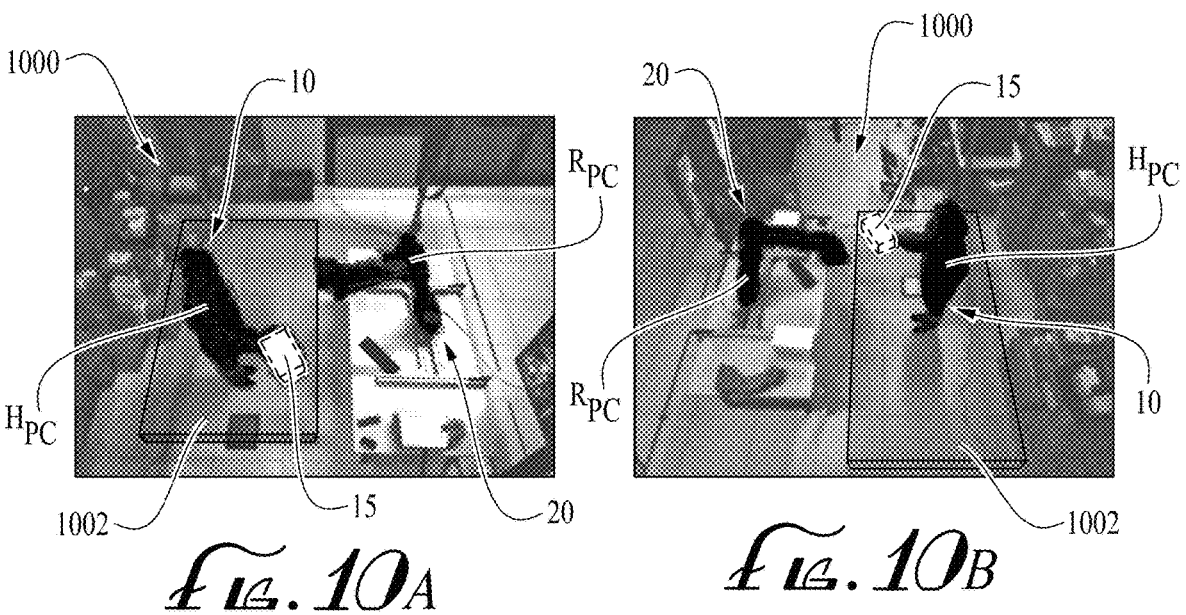
$FIG.10A$          $FIG.10B$
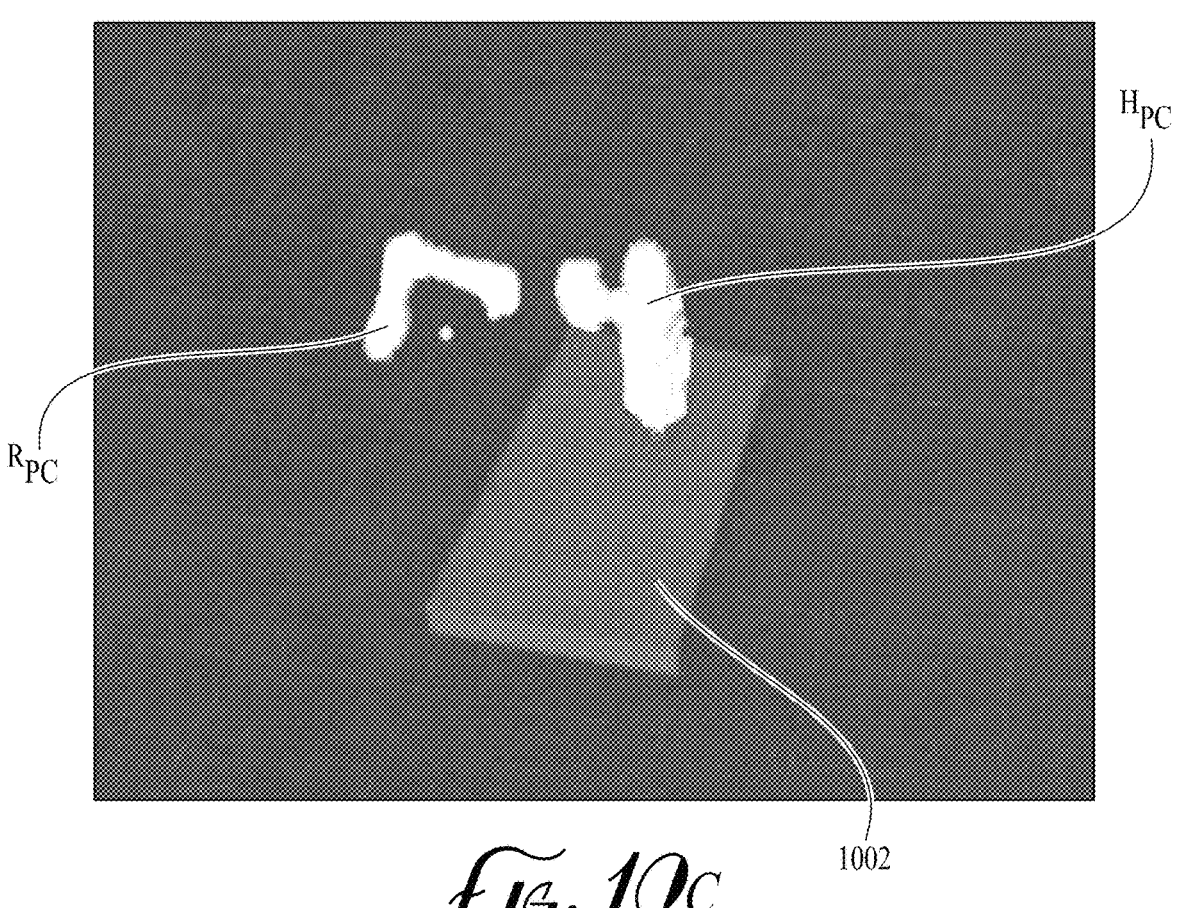
$FIG.10C$

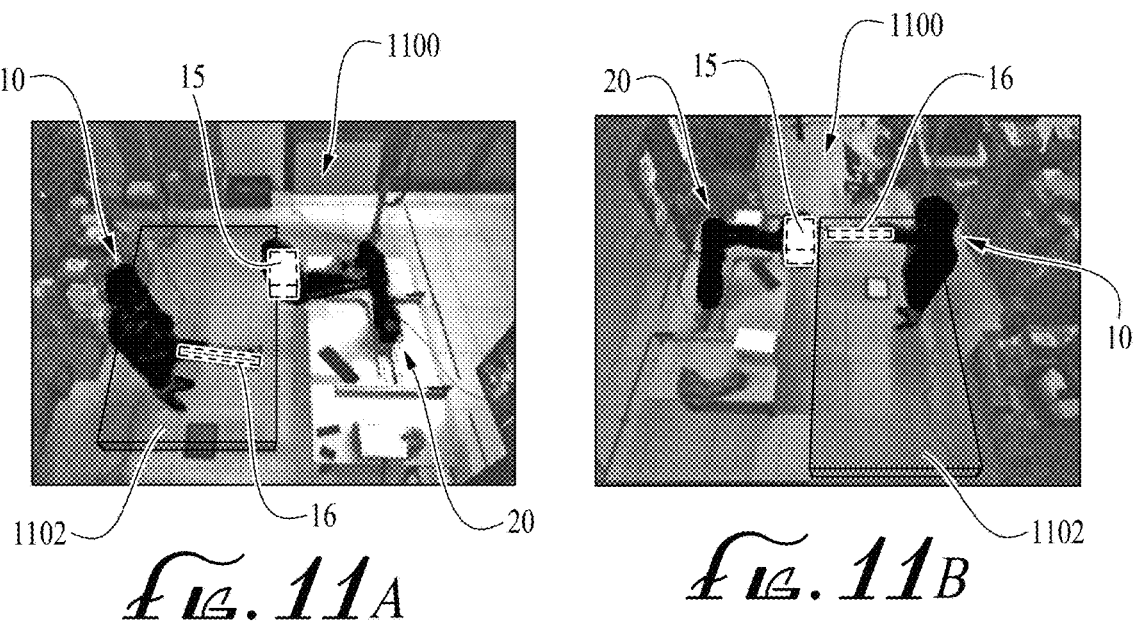
*Fig.11A*          *Fig.11B*
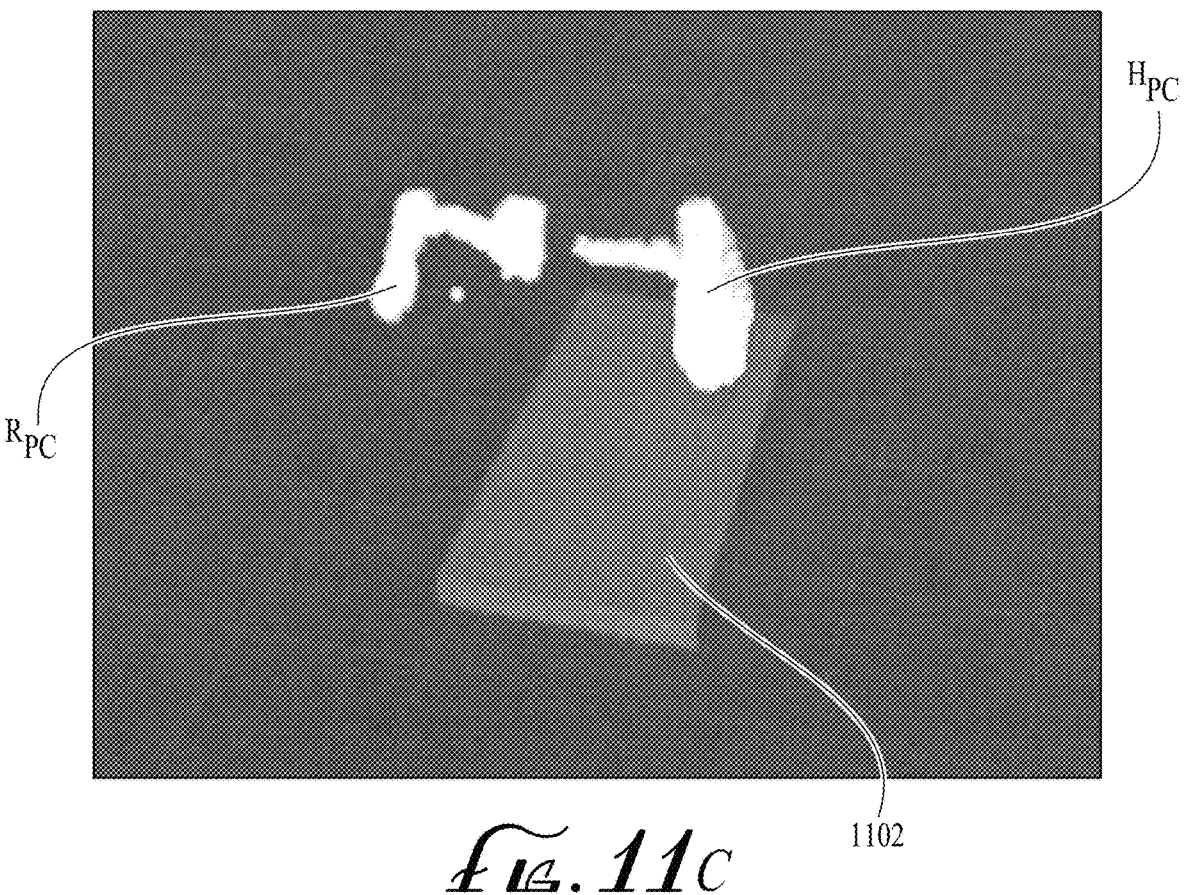
*Fig.11C*

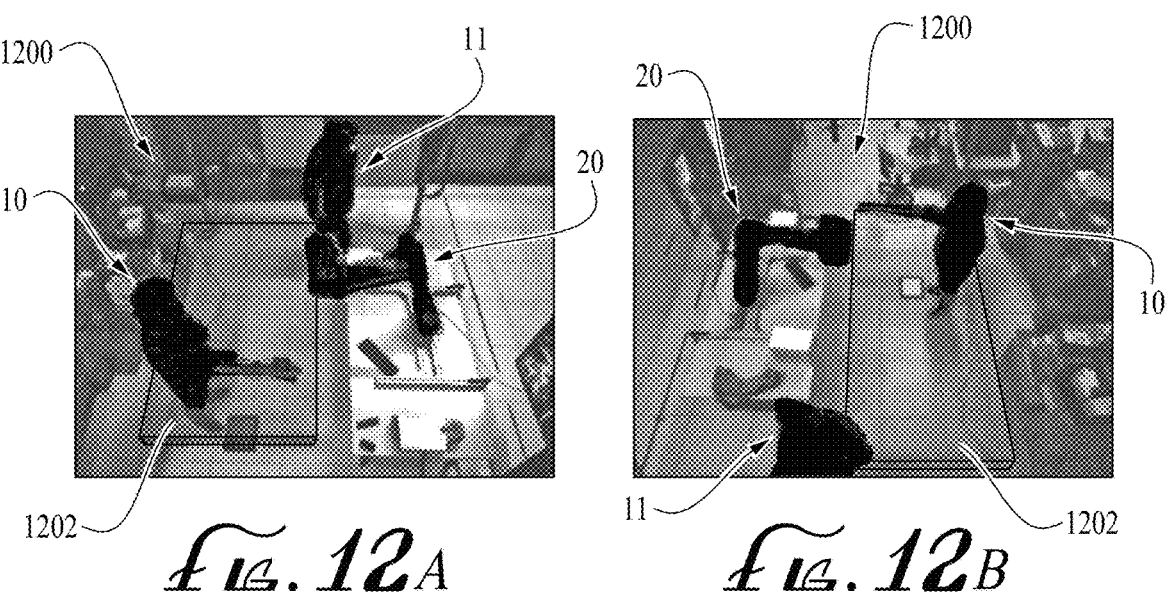
_Fig. 12A_
_Fig. 12B_
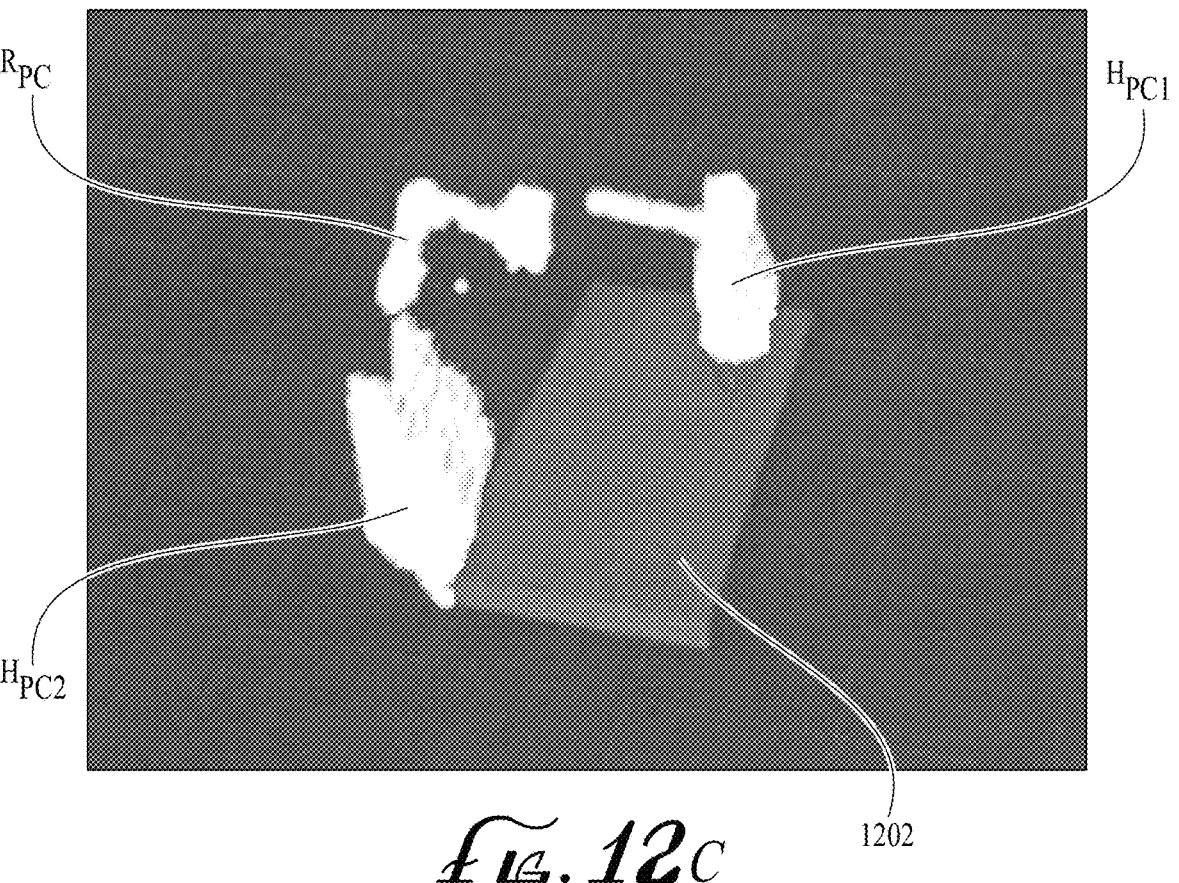
_Fig. 12C_

CLUSTERING AND DETECTION SYSTEM AND METHOD FOR SAFETY MONITORING IN A COLLABORATIVE WORKSPACE

INFORMATION ON EU FUNDING

The project leading to this application has received funding from the European Union's Horizon 2020 research and innovation programme under grant agreement No. 818087.

BACKGROUND

The present disclosure relates generally to systems and methods for monitoring a shared workspace to ensure the safety of a human working closely with dangerous machinery, such as a robot. In particular, the disclosure relates to systems and methods for identifying both the human and machine in a monitored workspace, along with any objects one or both may be carrying, to ensure proper safety protocols are constantly and efficiently maintained in a collaborative workspace.

Many industries have long relied on industrial robots and other automated equipment to complete various tasks in a safe and efficient manner. To ensure the safety of nearby human workers, this equipment may be isolated or deployed in separate workspaces and positioned behind fences or other protective barriers. In some industries, humans and robots can work effectively in this manner, so these isolation methods do not impact overall performance. However, in other environments, there is a substantial benefit derived from the synergy of having humans and robots coexisting and working together in a shared workspace. For such arrangements to function properly and realize the impact of a joint human and robot workforce, fences or other physical barriers are ineffective since they would inhibit some or all interaction between the human and robot. Accordingly, other safety measures are required to ensure human safety in the shared workspace is maintained while also fostering a productive environment.

To this end, various virtual barriers have been designed for controlling the actions of the robot (or other automated machine) when the conditions may pose an elevated risk to human safety. For example, in some configurations, an optical sensor system including one or more light emitters and detectors creates a light curtain that defines the boundaries of a safety zone between the human and robot. When the optical sensors detect the presence of the human near or within the safety zone, the system slows down or deactivates the robot to prevent potential injury to the human. While these sensor systems are relatively low cost and easy to configure, the safety zone defined by the light curtain is often static and exists in a two-dimensional space. Because of these limitations, the system is difficult to adapt to a dynamic workplace where the human and robot may be constantly moving, or where the robot moves through a series of wide-ranging trajectories, or where the human and/or robot are carrying objects that may themselves pose additional dangers.

Some more recent designs have employed three-dimensional optoelectronic sensors or other suitable equipment able to monitor three-dimensional space, such as stereo cameras and time-of-flight cameras. This technology may be used to accurately capture relative distance between the human and robot while one or both are moving within the safety zone. These configurations typically allow for a closer working relationship between a human and robot since the systems can precisely identify the relative locations between the human and robot in a three-dimensional space, and can be used in dynamic workplaces where the human and robot may move across a range of trajectories and in different movement speeds. Moreover, the safety zones may be constantly adapted based on a real-time position and movement velocity of the robot and the human.

However, even with the implementation of three-dimensional monitoring systems (as an improvement over the two-dimensional systems) to constantly monitoring the shared workspace, issues may nevertheless arise as conditions change while the human and the robot are moving throughout the workspace. For example, in some configurations, a robot (or other dangerous machine) may include a stationary base and one or more linkages designed to move over various possible trajectories at different speeds across the workspace. In other configurations, the base may be mounted on rails to increase the overall range of motion of the robot linkages within the workspace. In these and other configurations, one or more of the robot linkages may be adapted with an object or tool during different phases of its operation. Moreover, the human may also be carrying an object or tool at different times as the human moves through the shared workspace. While it is critical that a monitoring system is capable of detecting the relative position of the human and robot within the shared workspace to avoid collisions, it is likewise important that the system is capable of accounting for the objects or tools that may be carried by the human and/or robot to ensure the objects or tools do not create hazards.

Typically, robots include encoders for determining position and movement velocity for the robot and all robot linkages and controllers for issuing control commands to the robot linkages. Position and velocity information is integral for ensuring the safety of a shared workspace because this information is used in conjunction with a robot's three-dimensional modeling and kinematics to define where the robot is in space, where it will be in the near future. While it is certainly possible to preprogram the controller to account for tools and objects that may be carried and used by the robot during a routine operation, such systems would not be adaptable to changes in operation or conditions, such as the introduction of new objects or tools for the robot. Moreover, this approach would be limited to considering only objects carried by the robot and would fail to account for objects and tools carried by the human.

Accordingly, the inventors have identified a need for a system and method capable of dynamically accounting both the human and robot in a collaborate workspace, as well as any objects that one or both the human and robot may be carrying. For example, in certain industrial environments, the machine and/or human may cycle through various objects or tools of different shapes and sizes to complete a defined task or set of tasks. Accordingly, the inventors have identified that it would be advantageous for the monitoring system to detect and accurately account for a variety of objects or tools on the fly, and to do so in an efficient and streamlined manner to optimize overall performance while ensuring the workspace between the human and the robot is safe. Additional aspects and advantages of such methods will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIGS. 5-12C are various example embodiments of a working environment employing the safety analysis protocol of FIG. 4.

DETAILED DESCRIPTION OF DISCLOSED EMBODIMENTS

Figure 1:
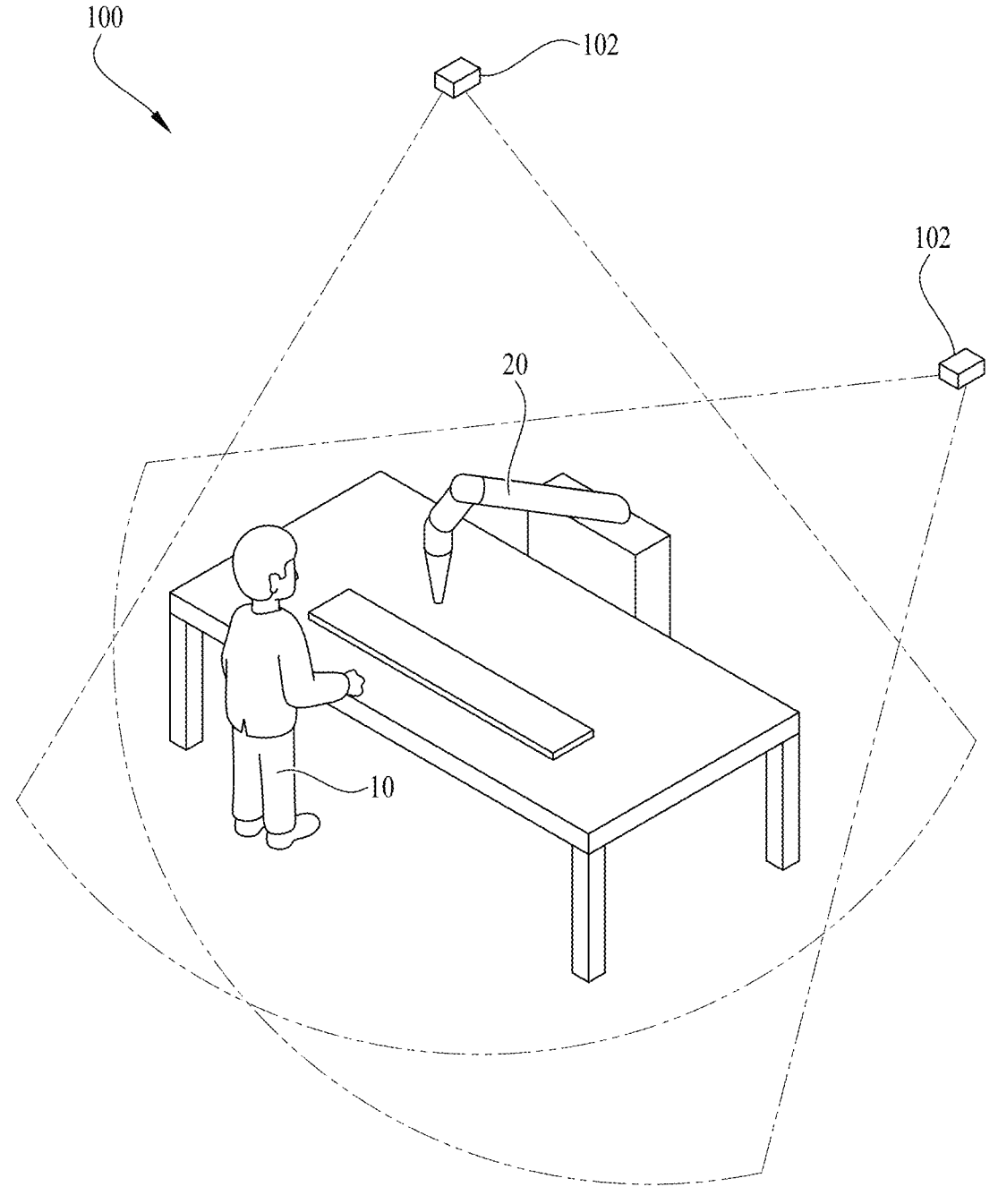
FIG. 1 is a schematic illustration of a monitored shared workspace in accordance with one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe the disclosed subject matter in the context of a workspace shared between a human and a robot to protect personnel and reduce the likelihood of inadvertent injuries to the human or damage to the robot. It should be understood that these references are merely example uses for the described systems and methods and should not be considered as limiting. The techniques described herein apply not only to robots in a workspace, but also to any form of dangerous automated machinery, including such machinery for which a minimum safe separation distance may vary over time due to movements of the machine. Moreover, in other embodiments, the concepts described herein may be adapted for uses in other arrangements that may differ from the workspace examples described herein.

In the field of robotics, standards ISO 10218 and ISO/TS 15066 set forth by the International Electrotechnical Commission (IEC) provide speed and separation monitoring guidelines for ensuring a safe workspace between an industrial robot and a human worker. Risk of injury to the human worker may be reduced in these environments by monitoring the workspace to ensure at least a protective separation distance, also referred to as a safety zone in the disclosure, between the human and robot is maintained to avoid collisions, and to guarantee a safe movement speed for the robot at all times while the human and robot move along the workspace. When a human presence is detected within the safety zone, the robot system may be slowed down, stopped, or have its trajectory path altered to avoid injury to the human or damage to the robot. As noted previously, however, such conventional approaches typically fail to account for objects and tools that may be carried by the robot and/or human while operating or moving within the shared workspace, or rely on overly restrictive constraints that unduly limit the movement speed of the robot.

As is further described in detail below with collective reference to the figures, the following disclosure relates to systems and methods designed to prioritize human safety in shared workspaces, while also maximizing the efficiency of robot movement based on the proximity of the human to the robot and an accounting for any objects or tools that the robot and/or human may be carrying within the workspace, among other variables. To this end, embodiments of the disclosure include systems and methods for monitoring a workspace, identifying, clustering, and labeling objects within the workspace as either being part of a robot (including objects carried by the robot) or a human (including objects carried by the human), and controlling actions of the robot (such as issuing a stop command or slowing down movement) based on the calculated separation distance between the robot and human.

As summarized above, the disclosed embodiments aim to consider not only the position and movement of the human body when determining separation distance, but also anything that is carried by the human as well as any object or tool carried by the robot. The inclusion of these additional variables to the analysis may reduce the overall hazards associated with the use of a robot in a shared workspace since the objects carried by the robot and/or human may be the root cause of a collision. Moreover, the disclosed subject matter may enable the monitoring system to consider a large variety of objects that may be carried by the human or robot without requiring any advanced information or preprogramming relating to those particular objects. In other words, the monitoring system may be configured to, on the fly, detect and account for any object carried by the human or the robot within the workspace. With these advantages, the safety of the human is prioritized without unduly impacting overall performance and efficiency of the robot in the shared workspace.

Figure 2:
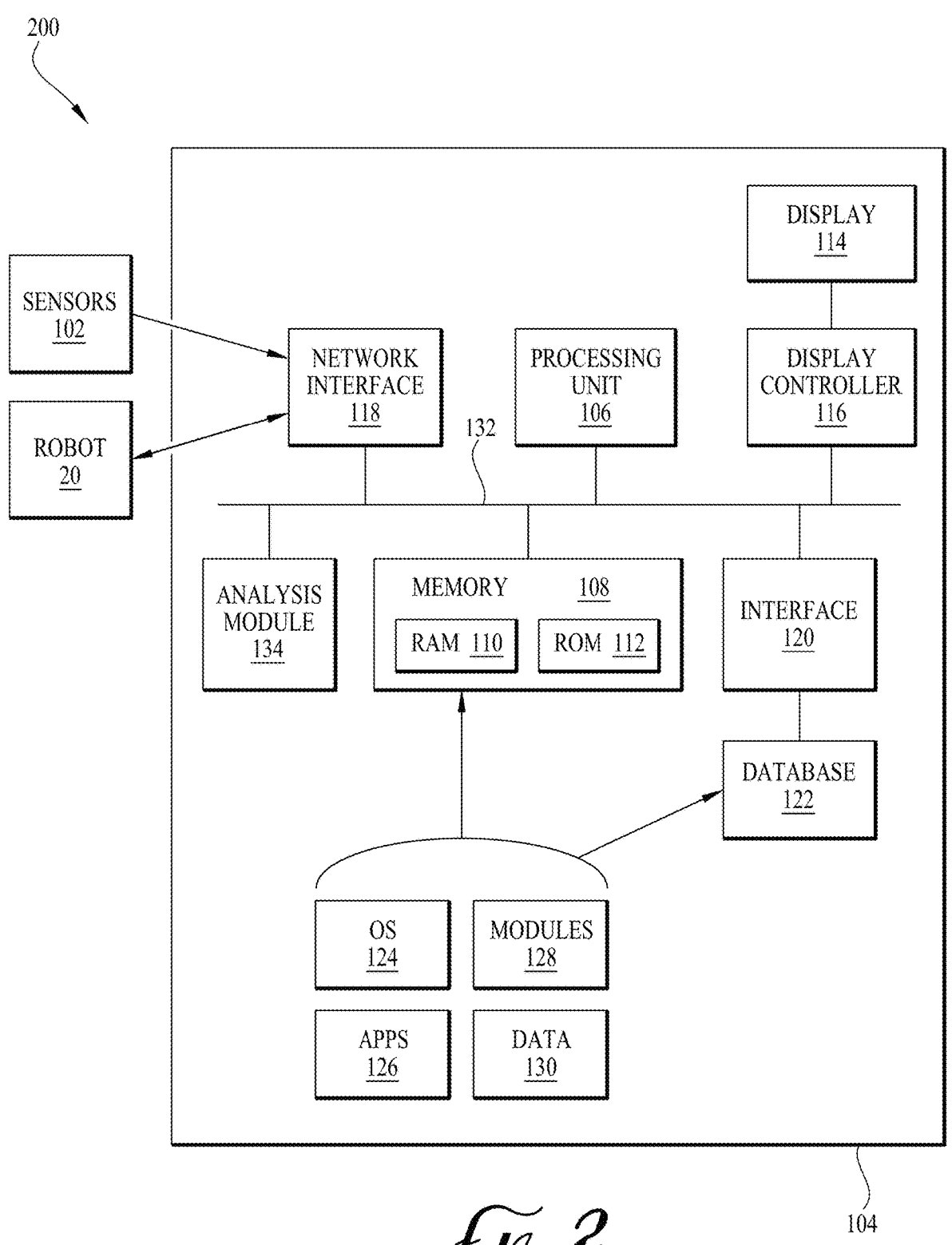
FIG. 2 is a block diagram illustrating an example control system for a workspace monitoring system in accordance with one embodiment.
Figure 3:
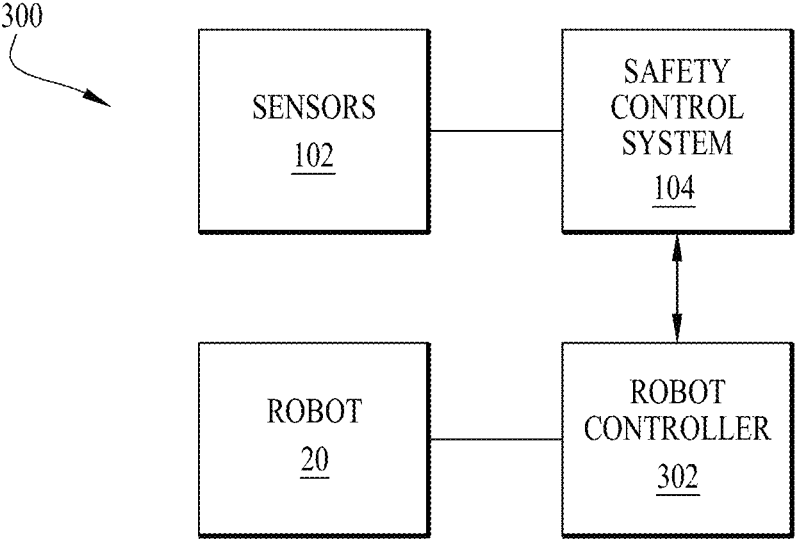
FIG. 3 is a block diagram illustrating a workspace monitoring system in accordance with one embodiment.

With reference to FIGS. 1-3, the following discussion provides a general overview of example systems and methods for monitoring a shared workspace between a human and a robot, followed by a detailed discussion with reference to FIGS. 4-12C of example methods and systems for monitoring a shared workspace while detecting and accounting for objects carried the human and/or robot to improve overall performance and safety.

Turning now to the figures, FIG. 1 schematically illustrates an example workspace 100 shared by a human 10 and a robot 20 (or another suitable machine). In the workspace 100, the human 10 and the robot 20 may work collaboratively, or may operate independently, or alternate between the two working arrangements. The workspace 100 is monitored by one or more sensors 102 arranged to collectively cover and monitor the workspace 100, particularly those regions of the workspace 100 where the human 10 and robot 20 interact collaboratively. The sensors 102 may be any suitable sensors capable of monitoring the workspace 100. In one embodiment, the sensors 102 are capable of obtaining three-dimensional images or other suitable data for use in determining a spatial relationship between the human 10 and robot 20 in either two-dimensional or three-dimensional space. For example, in some embodiments, the sensors 102 may include laser scanners, three-dimensional time-of-flight cameras, stereo vision cameras, three-dimensional LIDAR sensor or other radar-based sensors.

The workspace 100 may include any number of sensors 102 needed to ensure the sensors 102 collectively monitor the target regions of the workspace 100 as desired. Preferably, the sensors 102 are arranged to minimize or avoid occlusions to the extent possible to obtain as complete of a view as possible of the workspace shared between the human 10 and robot 20, and to effectively monitor the workspace 100 with fewer sensors 102. After arranging the sensors 102 around the workspace 100, their position relative to one another may be registered using any suitable method. For example, in one embodiment, images as between the sensors 102 may be compared to ensure proper calibration and coverage of the workspace 100, and to retrieve the relative position and orientation between the sensors 102 and the base of the robot 20. The calibration step may be used to identify occlusions or static objects in the sensor field-of-view to ensure those objects are accounted for and not considered in future analysis steps. With the sensors 102 properly calibrated relative to one another, the sensor data can be reliably used to monitor positions and movements of the human 10 and robot 20 in the workspace 100.

FIG. 2 is a block diagram illustrating components for an example safety control system 104 for a workspace monitoring system 300 (see FIG. 3) in accordance with one embodiment. With reference to FIG. 2, data from each sensor 102 monitoring the workspace 100 is received by the safety control system 104. The regions monitored and covered by each sensor 102 may be represented in any suitable form of volumetric representation. The safety control system 104 includes a central processing unit (CPU) 106 which may be any of various suitable commercially available processors or other logic machine capable of executing instructions. In other embodiments, suitable dual microprocessors or other multi-processor architectures may also be employed as the processing unit 106. The safety control system 104 further includes memory 108 which may be implemented using one or more standard memory devices. The memory devices may include, for instance, RAM 110, ROM 112, and EEPROM devices, and may also include magnetic or optical storage devices, such as hard disk drives, CD-ROM drives, and DVD-ROM drives. The memory 108 contains instructions stored therein for controlling operation of the CPU 106 and its interactions with other components of the safety control system 104. In some embodiments, the safety control system 104 may include a display 114 driven by a display controller 116.

The safety control system 104 further includes a network interface 118 to communicate with and receive data from the sensors 102. The network interface 118 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be incorporated to facilitate a WAN networking environment. The safety control system 104 may also include an interface 120 coupled to a database or internal hard drive 122. Interface 120 may also be coupled to removable memory, such as flash memory, a magnetic floppy disk drive, an optical disk drive, or another drive. Further, the interface 120 may be configured for external drive implementations, such as over a USB, IEEE 1194, or PCMCIA connection.

In one embodiment, any number of program modules may be stored in one or more drives 122 and RAM 110, including an operating system 124, one or more application programs 126, or other program modules 128 (such as instructions to implement the methods described herein), and data 130. All or portions of the program modules may also be cached in RAM 110. Any suitable operating system 124 may be employed, such as Windows Embedded CE, Windows Embedded Handheld, Windows Desktop, Android, Linux, iOS, MacOS, or other commercially available or proprietary operating systems.

The above-described components, including the processing unit 106, memory 108, display controller 116, network interface 118, and interface 120 may be interconnected via a bus 132. While a bus-based architecture is illustrated in FIG. 2, other types of architectures are also suitable (e.g., one or more components may be directly coupled to one another). While the illustrated embodiment depicts one possible configuration for a safety control system 104, it should be recognized that a wide variety of hardware and software configurations may be provided. For example, other embodiments may have fewer than all of these components or may contain additional components.

As noted previously, data from the sensors 102 monitoring the workspace 100 is received by the safety control system 104 via any suitable communications means, such as the network interface 118, and stored in memory 108 for processing by an analysis module 134. The analysis module 134 may employ conventional computer-vision techniques, such as deep-learning algorithms or deterministic algorithms, to analyze the data from the sensors 102 and distinguish between humans, automated machines (such as robots), workpieces, and other objects. In some embodiments, the analysis module 134 of the safety control system 104 may be programmed to analyze the data from the sensors 102 and determine the distance between the human 10 and robot 20 and transmit signals back to the robot 20 to adjust a movement speed or trajectory of the robot 20 to avoid potential injury to the human 10. Additional details relating to the processing steps undertaken by the analysis module 134 of the safety control system 104 to determine the appropriate instructions to send to the robot 20 are detailed below with particular reference to FIGS. 4-12C.

To establish a general frame of reference, the following briefly describes an example configuration a workspace monitoring system 300 and its functionality to ensure safety distances between the human 10 and robot 20 are maintained within the workspace 100. FIG. 3 is a schematic diagram illustrating general details of a workspace monitoring system 300 for ensuring the safety of a human 10 when working in a workspace 100 with a robot 20 in accordance with one embodiment. As described previously, sensors 102 monitor the workspace 100, where the sensors 102 continuously capture position data relating to the robot 20 and the human 10. The sensors 102 provide real-time information that is analyzed by the safety control system 104 (such as by the analysis module 134 and/or other components) to identify the location of the robot 20 and the human 10, and determine whether the human 10 is located a safe distance away from the robot 20.

As mentioned previously, all aspects of the robot's movement, such as range of motion, movement pattern, and velocity, may be governed by a robot controller 302 integrated with the robot 20. The robot controller 302 also determines the instantaneous state of the robot 20, including the current orientation of any robot limbs or joints, their respective movement patterns, and movement velocities. The robot controller 302 also includes all instructions relating to the robot model that controls the behavioral aspects of the robot 20 throughout its operational sequence.

In one example embodiment, the safety control system 104 first receives data from the sensors 102 and uses this information to construct a virtual representation of the objects in the scene and identify the location of the human 10, the location of the robot 20, and the location of other objects of interest in the workspace 100. If the safety control system 104 determines that a collision is likely or imminent, the safety control system 104 may communicate with the robot controller 302 to take a safe action, such as by deactivating the robot 20, slowing down the robot 20, or altering the movement pattern of the robot 20 to avoid the collision. Additional details of these and other embodiments are described below with reference to FIGS. 4-12C.

The following discussion begins with a brief introduction to the mathematical model as outlined in the ISO/TS 15066 safety standard referenced previously for determining a safe separation distance based on a relative position of the human 10 and the robot 20 to maintain safety in a shared workspace between the human 10 and robot 20. The concept behind the mathematical model aims to ensure that a minimum separation distance between the human 10 and robot 20 is maintained at all times. In configurations where the robot 20 may move across a range of trajectories at various speeds, the movement speed of the human 10 and robot 20, along with other variables, is used to determine the applicable protective separation distance that must be maintained at any given time. Based on the model, below is a mathematical formulation for calculating the protective separation distance, $S_p(t_0)$, as follows:

$$S_p(t_0) = S_h + S_r + S_s + C + Z_d + Z_r \qquad (1)$$

where:

$S_p(t_0)$ is the protective separation distance at a time $t_0$;

$t_0$ is the current time;

$S_h$ is the contribution to the protective separation distance attributable to the human's change in location;

$S_r$ is the contribution to the protective separation distance attributable to the robot system's reaction time;

$S_s$ is the contribution to the protective separation distance due to the robot's stopping distance;

C is the intrusion distance, as defined in ISO 13855; this is the distance that a part of the body can intrude into the sensing field before it is detected;

$Z_d$ is the position uncertainty of the human in the workspace, as measured by the presence-sensing devices resulting from the sensing system measurement tolerance; and $Z_r$ is the position uncertainty of the robot system, resulting from the accuracy of the robot position measurement system.

In the above equation, the contributions for $S_r$ and $S_s$ described in ISO/TS 15066 can be calculated as follows:

$$S_r = \int_{t_0}^{t_0 + T_r} v_r(t)dt \qquad (2)$$

where $v_r$ is the directed speed of the robot in the direction of the human in the workspace and $T_r$ is the robot reaction time. The directed speed may be positive or negative depending on whether the separation between the human and the robot is increasing or decreasing. Here, $v_r$ may vary due to either the robot's speed or a change in direction of the robot. The system is designed to limit $v_r$ depending on the separation distance. If a safety-rated speed limit is in effect, the system may trust the speed limitation performed by the robot system.

Similarly, $S_s$ can be calculated as follows:

$$S_s = \int_{t_0 + T_r}^{t_0 + T_r + T_s} v_s(t)dt \qquad (3)$$

where $v_s$ is the speed of the robot in the course of stopping, where the speed is calculated from the activation of the stop command until the robot has come to a full stop; $T_r$ is the robot reaction time; and $T_s$ is the robot stopping time. Here, $v_s$ is a function of time and can vary due to either the robot's speed or its change in direction. The system is designed to account for $v_s$ in the manner that most reduces the separation distance. For example, in the case where the robot's speed is not being monitored, the system assumes that equation (3) is the robot's stopping distance in the direction that most reduces the separation distance. On the other hand, if the robot's speed is being monitored, the system may use the robot's stopping distance based on the monitored speed, applied in the direction that most reduces the separation distance.

As noted in the discussion above, the protective separation distance between the human 10 and robot 20 as calculated using the mathematical model depends on various robot parameters (e.g., reaction time, stopping performance, etc.) and the parameters of a sensor or other monitoring devices (latency, accuracy, etc.). In a basic sense, the model can be used to control actions of the robot 20 based on the separation distance between the human 10 and robot 20. For example, if the human 10 is sufficiently far away from the robot 20, the robot's movement speed and trajectory may not be altered at all. As the human 10 approaches the robot 20 and closes the separation distance, then the speed and/or trajectory of the robot 20 may be slowed down. Finally, if the human 10 is too close to the robot 20, the robot 20 may be stopped. A safety action (such as an adjustment of the movement velocity of the robot 20) is taken by the robot 20 based, at least in part, on the separation distance.

While many of the parameters incorporated in the mathematical model can be preprogrammed or defined within a narrow set of ranges to optimize safety, particularly those relating to the robot's functionality, this approach tends to be overly restrictive and does not incorporate actions or changes occurring in workspace 100 in real time. Accordingly, the overall efficiency and performance of the robot 20 in the shared workspace 100 may be detrimentally impacted because the robot may be stopped or slowed down more often than necessary given the applicable constraints when the mathematical model outlined in the ISO/TS 15066 is used alone as the primary safety method.

With reference to FIGS. 4-12C, the following discussion provides details of systems and methods for improved systems and methods of monitoring the workspace 100, while accounting for objects introduced and used by the human 10 and/or robot 20 to promote efficiency and ensure overall safety.

Figure 4:
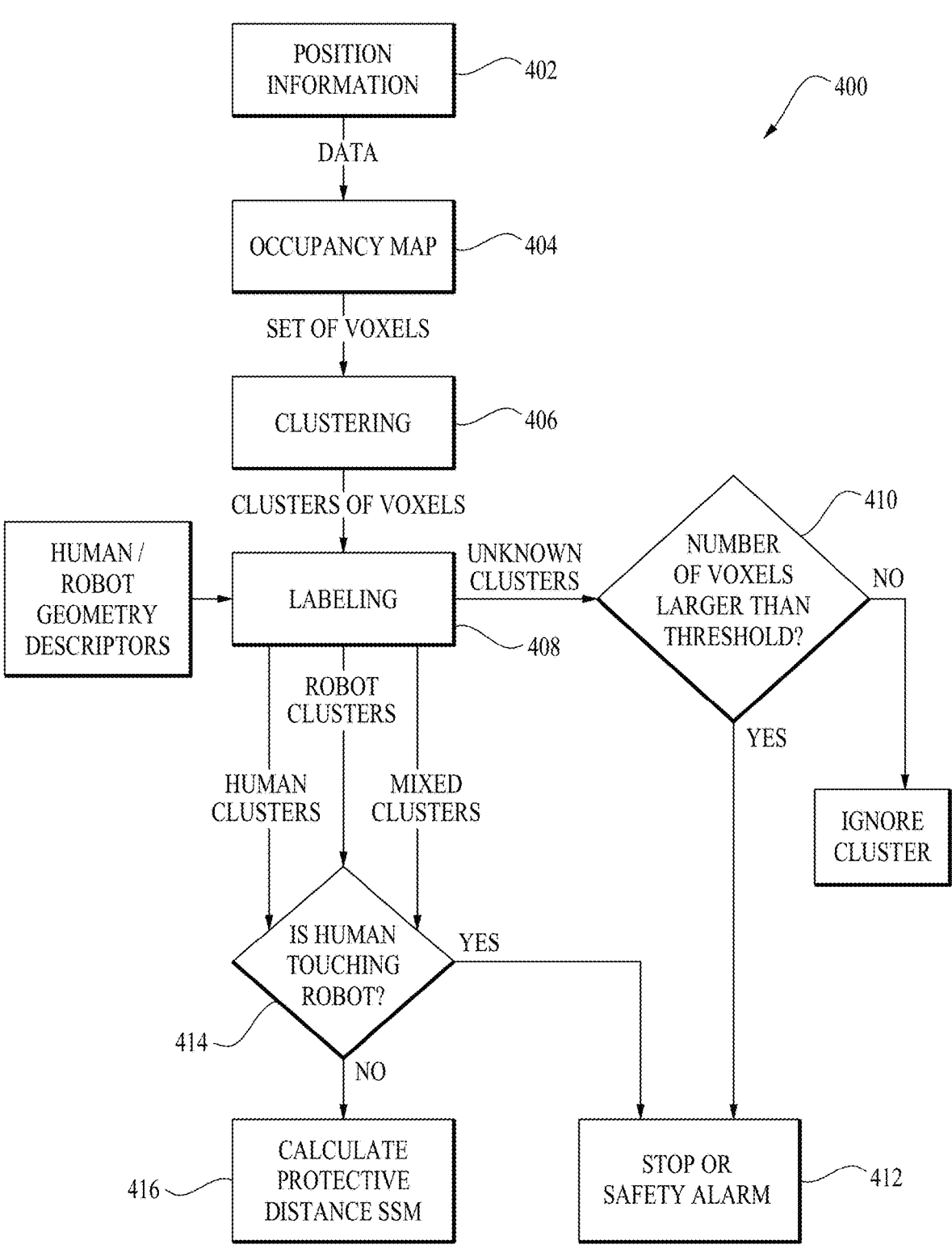
FIG. 4 is a flow chart illustrating a safety analysis protocol of the workspace monitoring system to maintain a safe working environment.

FIG. 4 is a flow chart illustrating a method 400 relating to a safety analysis protocol performed by the safety control system 104 of the workspace monitoring system 300 to maintain a safe working environment. As mentioned previously, the mathematical model described in the ISO/TS 15066 provides general safety standards to help ensure that a collision between the human 10 and the robot 20 does not occur. As is further described in detail below, the safety analysis protocol described in method 400 incorporates additional analysis steps to account for objects that may be carried by the human 10 and/or the robot 20 in the workspace 100 to optimize and determine appropriate safety instructions for the robot 20.

With reference to FIG. 4, at step 402, the sensors (such as sensors 102 of FIG. 1) obtain position information for the human 10 and the robot 20 in the workspace 100, along with information for workpieces or other objects also present in the workspace 100. As noted previously, the sensors 102 may include laser scanners, three-dimensional cameras, or other suitable optoelectronic devices used to monitor the position of the human 10 and robot 20 within the workspace 100. At step 404, the data (e.g., raw data) including the position information obtained by the sensors is transmitted to and received by the safety control system 104, which in turn (via the analysis module 134 and/or other components) analyzes the data and generates a three-dimensional occupancy map to reconstruct the scene and represent the captured objects (e.g., human 10, robot 20, hazards, unknown objects, etc.) as voxels, meshes, or other suitable data points in the monitored scene. It should be understood that while the foregoing description refers to the data points as voxels, this configuration represents one embodiment and other suitable data points may be used for reconstructing the occupancy map in other embodiments. At step 406, the analysis module 134 (and/or other components of the safety control system 104) clusters the voxels in the reconstructed image by assigning a common cluster identification to sets or groups of occupied voxels that are connected to one another. This step 406 can be completed using a flood fill algorithm or other suitable methods in either two-dimensions or three-dimensions depending on the source data captured by the sensors. At the completion of step 406, all connected voxels may form individual clusters in the spatial space of the reconstructed image (see FIGS. 5A-12C for examples).

At step 408, once the voxel clusters have been generated, each cluster may be labeled as a human cluster, a robot cluster, or a mixed cluster (e.g., human touching robot). Anything that cannot be conclusively categorized into one of these three cluster categories may be labeled as an unknown cluster. During the labelling process at step 408, each voxel cluster is analyzed to check if a point (i.e., a voxel) within that voxel cluster crosses or intersects with a predefined geometry descriptor associated with either a robot or a human. The predefined region may be a single point (for a one-dimensional geometry descriptor), a predefined plane (for a two-dimensional geometry descriptor), or a predefined volume, such as a cube or sphere (for a three-dimensional geometry descriptor), and the workspace 100 may include multiple predefined regions. Examples of the latter two predefined regions are provided with reference to FIGS. 5A-12C and discussed in further detail below for reference purposes.

For labeling purposes at step 408, if a single voxel within the cluster intersects a given human/robot geometry descriptor, the label applied to that voxel is propagated through to all voxels in the voxel cluster. For example, a voxel cluster is labeled a human cluster if at least one voxel within the voxel cluster intersects a predefined region of the workspace 100 associated with a human. Similarly, a voxel cluster is labeled a robot cluster if at least one voxel within the voxel cluster intersects a predefined region of the workspace 100 associated with a robot. In some embodiments, different voxels belonging to the same cluster can touch or intersect multiple geometry descriptors with the workspace 100. In these instances, the voxel cluster may be designated a mixed cluster, which typically indicates that the human 10 is touching the robot 20 in the workspace 100. Within the parameters described above, the final labeling of the identified voxel clusters is set using simple rules summarized in Table 1 below:

TABLE 1

| | Cluster Labelling Process | | |
| --- | --- | --- | --- |
| Cluster ID | Intersects Human Geometry Descriptor | Intersects Robot Geometry Descriptor | Label |
| Cluster 0 | NO | NO | UNKNOWN |
| Cluster 1 | YES | NO | HUMAN |
| Cluster 2 | NO | YES | ROBOT |
| Cluster 3 | YES | YES | MIXED |

As mentioned earlier, the clustering process in step 406 automatically assigns a common cluster identification to every connected voxel within an identified cluster. In this fashion, the labeling process at step 408 automatically associates any object or tool carried by the robot 20 (such as an object or tool attached or carried on a link or joint of the robot) or human 10 (such as an object held in a hand or carried) as part of the robot cluster or the human cluster (or a mixed cluster). Accordingly, the method 400 is able to account for any object or tool of any shape or size present within the workspace 100 when calculating the minimum protective separation distance and/or determining whether to generate a stop or safety signal.

Returning to FIG. 4 and Table 1, any clusters that intersect neither the human nor the robot geometry descriptor may be labeled as unknown clusters. These unknown clusters may be a cause for concern since they could very well be an obstruction or other object that may create safety issues. At the very least, these unknown clusters require further consideration and analysis as an additional safety measure. Any one of various suitable analysis techniques may be applied to determine a suitable action for handling unknown clusters. For example, in one embodiment, at step 410, any unknown cluster may be further analyzed and compared to determine whether it exceeds a predetermined threshold to ensure the unknown cluster is not simply a miscalculation or other artifact that may have occurred at any of the prior processing steps in the method 400. In this embodiment, if the number of voxels in the unknown cluster is smaller than the predetermined threshold, then the cluster can be safely ignored and no action may be taken since the object may be small or the unknown cluster may be an artifact. However, if the number of voxels in the cluster is larger than the predetermined threshold, then this may indicate that the unknown cluster is a sufficiently large object in the workspace 100 and could pose a hazard. In other embodiments, artificial intelligence protocols may be applied to establish the nature of the unknown objects and to determine any potential risk. In still other embodiments, other suitable processing techniques may be employed.

After the processing step 410, at step 412, the safety control system 104 may determine that an appropriate safety action is necessary. In such instances, the safety control system 104 may generate and transmit a signal to the robot controller 302 to stop (or slow down) all actions by the robot 20, or may generate a safety alarm to raise awareness of the potential hazard and ensure the cause is investigated. It should be understood that these examples are not intended to be limiting, and the safety control system 104 may take other safety actions as appropriate in other embodiments.

For the remaining clusters (e.g., human clusters, robot clusters, mixed clusters), at step 414, the safety control system 104 determines whether the human 10 (including any object or tool carried by the human 10 since those are part of the human cluster) is touching the robot 20 (including any object or tool carried by the robot 20 since those are part of the robot cluster). This analysis essentially reduces to identifying any instances where the labeling step resulted in a finding of any mixed clusters. If none of the identified human and robot clusters are overlapping (in other words, if there are no mixed clusters), then at step 416, the safety control system 104 (such as via the analysis module 134), may calculate the minimum protective separation distance (such as using the mathematical model described earlier) to ensure appropriate safety is maintained in the workspace 100 based on a relative position of the identified human and robot clusters. If instead the safety control system 104 finds any instance of the human 10 touching the robot 20 (in other words, a finding of any mixed clusters), then the safety control system 104 may issue a stop or generate a safety alarm in a similar manner as described previously in step 412.

As described, the method 400 enables the monitoring system 300 to account for any objects (such as boxes, tools, or other items) that may be carried by the human 10 and/or the robot 20 by essentially treating any such objects as an extension of the carrier. In this fashion, the method 400 is able to ensure that the objects are taken into account when monitoring the workspace 100 to ensure that collisions between the human 10 and robot 20 (or any respective objects carried by them) are entirely avoided.

FIG. 5-7 are example embodiments of a workspace 500 illustrating a visual representation of an employment of the safety analysis protocol of method 400 described in FIG. 4. In particular, FIG. 5 illustrates an example operation of the clustering and labeling processes described with reference to steps 406, 408 of method 400. With reference to FIG. 5, the workspace 500 includes a collaboration area 502 between a human 10 and a robot 20. The workspace 500 includes a first safety entrance detection plane 504 adjacent the robot 20 that may be monitored by an overhead sensor (such as sensor 102 of FIG. 1) or other suitable optoelectronic device mounted above the collaboration area 502. Similarly, adjacent the human 10 is a second safety entrance detection plane 506 that may be monitored by a second sensor (not shown) arranged in a similar fashion. Preferably, the respective detection planes 504, 506 span across the collaboration area 502 along a region where either the human 10 or the robot 20 would enter so that the respective detection planes 504, 506 are able to detect instances when either the human 10 or the robot 20 crosses the respective detection planes 504, 506 as they move relative to the collaboration area 502. With reference to the method 400 of FIG. 4, the detection planes 504, 506 are examples of two-dimensional geometric descriptors described therein.

In the example operation of FIG. 5, as related to method 400 of FIG. 4, when the robot 20 (or a portion thereof) moves across the detection plane 504 in a direction of motion R toward the human 10 and into the collaboration area 502, the portion of the robot 20 (i.e., all voxels of the robot 20) crossing the detection plane 504 is labeled as a robot cluster. Further, as described in the clustering protocol of step 406, all voxels connected to those voxels crossing the detection plane 504 are also labeled as part of the robot cluster. If the robot 20 is carrying or moving an object (not shown) through the detection plane 504 and into the collaboration area 502, that object is also labeled as part of the robot cluster based on the clustering protocol. A similar labeling process occurs for the human 10 moving across the detection plane 506 in a direction of motion H toward the robot 20 and into the collaboration area 502. Similarly, any object the human 10 is carrying and moving through the detection plane 506 is also labeled as part of the human cluster. With reference to FIG. 4 and method 400, the robot and human clusters (as identified and labeled via the respective detection planes 504, 506) are then analyzed to determine whether any part of the human cluster is touching any part of the robot cluster to assess whether any safety action is required.

In some embodiments, the safety control system 104 may consider dynamic rules in view of the evolution of the scene in determining how to properly label objects in the collaboration area. For example, with reference to FIGS. 6 and 7, the workspace 600 is arranged in a similar fashion as that illustrated in FIG. 5 with a human 10, a robot 20, a collaboration area 602, and detection planes 604, 606. In these embodiments, the safety control system 104 (see FIG. 2) is configured to label a cluster as a human cluster if the cluster traverses the detection plane 606 only in a first direction of motion H (e.g., from the human 10 into the collaboration area 602 and toward the robot 20) but not in a second direction of motion R (from the robot into the collaboration area 602 and toward the human 10. With these rules in place, in FIGS. 6 and 7, the human 10 moves from an initial position toward the collaboration area 602 and traverses the detection plane 606 moving in the first direction of motion H toward the collaboration area 602 and the robot 20. Given operation of the dynamic rules, the safety control system 104 will detect the presence of the human 10, and any voxels crossing the detection plane 606 are assigned a human cluster identification, and all remaining voxels connected to those voxels will also be assigned to the human cluster identification.

However, in FIGS. 6 and 7, the object 608 is travelling across the collaboration area 602 and crosses the detection plane 606 moving along the second direction of motion R. As the object 608 crosses the detection plane 606, the safety control system 104 detects the object 608, but implementation of the dynamic rules means object 608 is not assigned a human cluster identification because it crossed the detection plane 606 in the wrong direction.

FIGS. 8A-12C collectively illustrate example embodiments of the clustering and labeling processes of method 400 using a three-dimensional cuboid as the operative human/robot geometry descriptor for labeling identified voxel clusters. The following discussion addresses each set of figures in turn with reference to the method 400 of FIG. 4.

FIGS. 8A and 8B are camera views of a workspace 800 taken from different points of view, respectively, and FIG. 8C is a reconstruction of those images taken of the workspace 800. The set of images in FIGS. 8A-8C illustrate a human, shown in the form of a human point cloud $H_{PC}$ (a set of three-dimensional points) and a robot, similarly shown in the form of a robot point cloud $R_{PC}$. In some embodiments, the respective point cloud for both the human 10 and the robot 20 may be retrieved from the sensor data obtained at step 402. In other embodiments, the safety control system 104 (such as via the analysis module 134 or other suitable component) may instead retrieve the sets of three-dimensional points associated with the robot via communication with the robot controller (such as robot controller 302 of FIG. 3) or via any other suitable system able to retrieve robot volume occupation, and the human point cloud from the sensor data. In FIGS. 8A-8C, the workspace 800 illustrates an instance where the human 10 and robot 20 are spaced apart from one another and maintain an appropriate safety distance, meaning no stop or slow signal is triggered when implementing the safety analysis protocol of method 400. In FIG. 8C, the minimum safety distance, $D_M$, (the shortest point separating the respective point clouds) is illustrated for reference purposes.

Turning now to FIGS. 9A-9C, in the workspace 900, the human 10 has moved toward the robot 20 and is reaching out to touch the robot 20 (or an object 15 carried on an arm of the robot 20). As described previously with reference to method 400, both the robot 20 and the object 15 held by the robot 20 are labeled as part of a robot cluster identification. Turning to the method 400, in particular step 414, because the human cluster (represented by the human point cloud, $H_{PC}$, in FIG. 9C) is touching the robot cluster (represented by the robot point cloud, $R_{PC}$ in FIG. 9C), the safety control system 104 determines that this is a mixed cluster. Accordingly, the safety control system 104 generates a safety signal to trigger a stop, a slowdown, or take other suitable safety action to ensure the safety of the human 10 in the workspace 900.

Turning now to FIGS. 10A-10C, the floor of the workspace 1000 includes a human detection cuboid 1002 spanning across a portion thereof. In a similar fashion as described previously, the human detection cuboid 1002 may be monitored by any suitable overhead sensor system. In the workspace 1000, the human 10 is illustrated as holding an object 15 and standing away from the robot 20. In this example, the human geometric descriptor labels any voxel cluster (as identified via the clustering step 406 of the method 400) in the scene that contacts the human detection cuboid 1002 a human cluster. As discussed previously with reference to step 406 of method 400, since the object 15 is held by the human 10, both the human 10 and the object 15 are labeled as part of the human cluster identification since some voxels associated with the human 10 contact the human detection cuboid 1002, and the voxels for both the human 10 and object 15 are spatially connected with one another. For reference, the workspace 1000 may include a robot detection cuboid (not shown) underneath the base of the robot 20 to identify voxels associated with the robot 20 as part of a robot cluster, which would include the voxels touching the robot detection cuboid and all other voxels connected thereto. FIG. 10C illustrates a reconstruction of the views of FIGS. 10A-10B illustrating both the human point cloud $H_{PC}$ (inclusive of the object 15) and the robot point cloud RPC.

FIGS. 11A-11C illustrate a workspace 1100 arranged in a similar fashion as workspace 1000 of FIGS. 10A-10C, with both the robot 20 carrying a first object 15 and the human 10 carrying a second object 16. Again, in a similar fashion as noted above, the robot detection cuboid (not shown, but formed underneath the base of the robot 20) results in all voxel clusters contacting the robot detection cuboid being labeled as part of a robot cluster identification (including the robot 20 and the first object 15 it carries). Similarly, the human detection cuboid 1102 labels both the human 10 and the second object 16 it carries as part of the human cluster identification. For reference purposes, in both the embodiments illustrated in FIGS. 10A-10C and 11A-11C, the robot 20 and the human 10 (including the respective objects 15, 16 each carry) are sufficiently spaced apart from one another (as determined by the method 400) to ensure safety of the human 10. Accordingly, in this configuration, normal operation of the robot 20 may continue.

FIGS. 12A-12C illustrate a workspace 1200 arranged in a similar fashion as workspace 1100 of FIGS. 11A-11C. Notably, a first human 10 is standing adjacent the robot 20, but in this example embodiment, a second human 11 is present in the workspace 1200 as well. As illustrated in FIGS. 12A-12C, once the second human 11 is present within the human detection cuboid 1202, their presence is detected, as illustrated in the reconstruction image shown in FIG. 12C. In FIG. 12C, the reconstruction illustrates a first point cloud, $H_{PC1}$, associated with the first human 10, and a second point cloud, $H_{PC2}$, associated with the second human 11. In this embodiment, method 400 considers both humans 10, 11 in the workspace 1200 when both are present within the human detection cuboid 1202. In other words, if either of the humans 10, 11 is touching the robot 20, then the safety control system 104 (see FIG. 2) will trigger an appropriate safety action for stopping or slowing the robot 20 as described previously.

In some embodiments, the robot may be configured to move across a wide-range of positions across the workspace. For example, the robot may be mounted on a rail system to enable the robot to move from position to position within the workspace as needed. In such embodiments, the monitoring system may include multiple detection regions (or cuboids) to ensure the relevant area (i.e., the area adjacent the robot) is always being monitored relative to a current position of the robot in the workspace. With reference to the example embodiment of FIGS. 12A-12C, when the robot 20 is at a first location within the workspace 1200, a first human detection cuboid 1202 may be positioned at a corresponding first location to detect a human presence therein. Thereafter, when the robot 20 moves to a different second location within the workspace 1200, a second human detection cuboid (similar to 1202) may be positioned at a correspondence second location to detect a human presence therein. The monitoring system (such as monitoring system 300) will receive data from all sensors arranged throughout the workspace 1200, but the safety control system 104 may only evaluate data received from either the first human detection cuboid or the second human detection cuboid based on whichever cuboid is closest to the current position of the robot 20. In this fashion, the safety control system 104 ensures that the safety protocol of the method 400 is being considered only for a human 10 at risk of a potential collision with the robot 20, that is, the human 10 present within the human detection cuboid closest to the robot 20. As the robot 20 moves through the various locations within the workspace 1200, the process described above may be repeated for each of the various locations based on the presence of the robot 20.

As described, the method 400 and the related systems illustrated in the figures provide an efficient, streamlined process for ensuring the safety of a human in a workspace shared with a robot or other dangerous machinery. In addition, the disclosed subject matter provides systems and methods capable of accounting for various objects that may be carried by the human, the robot, or both in the shared workspace without requiring any advanced or prepro-grammed information about the objects themselves. The objects are detected and labeled on the fly by the monitoring system, thereby optimizing the safety protocols and ensuring that the safety protocols can be easily adapted to apply to any working environment.

It should be understood that in some embodiments, certain of the steps described in method 400 may be combined, altered, varied, and/or omitted without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method for monitoring a shared workspace including a machine and a human, the method comprising:

receiving, via a safety control system, data including (a) position information associated with a position of a human within the workspace and (b) position information associated with a position of a machine within the workspace, wherein the data includes position information relating to any respective object carried by one or both of the human and the machine;

generating, via the safety control system, an occupancy map based on the data, wherein the occupancy map includes data points relating to a captured position of the human, the machine, and the respective object carried by one or both the human and the machine within the workspace;

clustering, via the safety control system, the data points in the occupancy map to form a plurality of cluster sets, wherein each cluster set contains all neighboring occupied data points in the occupancy map that are connected to one another;

receiving, via the safety control system, a first set of predefined descriptors containing instructions for associating the data points in the plurality of cluster sets with the human and a second set of predefined descriptors containing instructions for associating the data points in the plurality of cluster sets with the machine;

assigning, via the safety control system, at least some of the cluster sets as (1) a human cluster based on the first set of predefined descriptors, the human cluster representing the position of the human within the workspace along with any respective object carried by the human, or as (2) a machine cluster based on the second set of predefined descriptors, the machine cluster representing the position of the machine within the workspace along with any respective object carried by the machine, or as (3) a mixed cluster based on both the first and second set of predefined descriptors, the mixed cluster indicating an overlap of at least one human cluster and at least one machine cluster within the occupancy map;

determining, via the safety control system, whether at least one cluster set is assigned as the mixed cluster;

generating, via the safety control system, a safety action signal in response to the safety control system determining that at least one cluster set is assigned as the mixed cluster; and calculating, via the safety control system, a protective separation distance between the human cluster and the machine cluster in response to the safety control system determining that no mixed cluster is assigned to any of the cluster sets, wherein in response to the protective separation distance being greater than a threshold distance, a movement speed and trajectory of the machine are maintained, and/or wherein in response to the protective separation distance being less than the threshold distance, the movement speed and/or trajectory of the machine are slowed down.

2. The method of claim 1, wherein the first set of predefined descriptors includes a first predefined region of the workspace associated with the human, and the second set of predefined descriptors includes a second predefined region of the workspace associated with the machine, the method further comprising:

analyzing, via the safety control system, each data point in the occupancy map to determine whether at least one data point within the respective cluster set intersects the first predefined region of the workspace associated with the human or the second predefined region of the workspace associated with the machine, and wherein the step of assigning at least some of the cluster sets is based on whether at least one data point within the respective cluster set intersects the first predefined region or the second predefined region.

3. The method of claim 2, wherein the machine is movable between a first location and a second location within the workspace, and wherein the first predefined region of the workspace is at a first position based on the first location of the machine, and wherein the first predefined region of the workspace is at a second position based on the second location of the machine.

4. The method of claim 2, wherein the first predefined region and second predefined region of the workspace is a one-dimensional point, a two-dimensional plane, or a three-dimensional volume.

5. The method of claim 2, further comprising:

identifying, via the safety control system, any cluster set for which no data point within the respective cluster set intersects either the first predefined region or the second predefined region;

comparing, via the safety control system, a total number of data points within the respective cluster set to a predetermined threshold value; and transmitting, via the safety control system, a second safety action signal in response to the safety control system determining that the total number of data points in the respective cluster exceeds the predetermined threshold value.

6. The method of claim 1, further comprising:

analyzing, via the safety control system, each cluster set to determine whether at least data point within the respective cluster set intersects a first predefined region of the workspace associated with the human or a second predefined region of the workspace associated with the machine;

determining, via the safety control system, a direction of motion for each of the at least data point intersecting the respective first predefined region or second predefined region; and wherein the step of assigning at least some of the cluster sets as the human cluster or the machine cluster is based both on whether at least one data point within the respective cluster set intersects the first predefined region or the second predefined region and the direction of motion of the at least one data point as it intersects the respective first predefined region or the second predefined region.

7. The method of claim 1, further comprising generating, via the safety control system, an alarm in response to the safety action signal.

8. The method of claim 1, further comprising:

communicating, via the safety control system, the safety action signal to a machine controller associated with the machine; and adjusting, via the machine controller, an action of the machine based on the safety action signal.

9. The method of claim 1, further comprising:

obtaining, via one or more sensors arranged to monitor the workspace, the data; and transmitting, via the one or more sensors, the data to the safety control system.

10. A system for monitoring a shared workspace including a machine and a human, the system comprising:

one or more sensors arranged to monitor the workspace including a human and a machine, the one or more sensors obtaining data including (a) position information associated with a position of a human within the workspace and (b) position information associated with a position of a machine within the workspace, wherein the data includes position information relating to any respective object carried by one or both of the human and the machine; and a safety control system operable to receive the data, the safety control system further operable to:

generate an occupancy map based on the data, wherein the occupancy map includes data points relating to a captured position of the human, the machine, and the respective object carried by one or both the human and the machine within the workspace;

cluster the data points in the occupancy map to form a plurality of cluster sets, wherein each cluster set contains all neighboring occupied data points in the occupancy map that are connected to one another;

receive a first set of predefined descriptors containing instructions for associating the data points in the plurality of cluster sets with the human and a second set of predefined descriptors containing instructions for associating the data points in the plurality of cluster sets with the machine;

assign at least some of the cluster sets as (1) a human cluster based on the first set of predefined descriptors, the human cluster representing the position of the human within the workspace along with any respective object carried by the human, or as (2) a machine cluster based on the first set of predefined descriptors, the machine cluster representing the position of the machine within the workspace along with any respective object carried by the machine, or as (3) a mixed cluster based on both the first and second set of predefined descriptors, the mixed cluster indicating an overlap of at least one human cluster and at least one machine cluster within the occupancy map;

determine whether at least one cluster set is assigned as the mixed cluster;

generate a safety action signal in response to the safety control system determining that at least one cluster set is assigned as the mixed cluster; and calculate a protective separation distance between the human cluster and the machine cluster in response to the safety control system determining that no mixed cluster is assigned to any of the cluster sets, wherein in response to the protective separation distance being greater than a threshold distance, the safety control system maintains a movement speed and trajectory of the machine, and/or wherein in response to the protective separation distance being less than the threshold distance, the safety control system slows down the movement speed and/or trajectory of the machine.

11. The system of claim 10, wherein the first set of predefined descriptors includes a first predefined region of the workspace associated with the human, and the second set of predefined descriptors includes a second predefined region of the workspace associated with the machine, and wherein the safety control system is further operable to analyze each data point in the occupancy map to determine whether at least one data point within the respective cluster set intersects the first predefined region of the workspace associated with the human or the second predefined region of the workspace associated with the machine, and wherein the safety control system assigns at least some of the cluster sets based on whether at least one data point within the respective cluster set intersects the first predefined region or the second predefined region.

12. The system of claim 11, wherein the machine is movable between a first location and a second location within the workspace, and wherein the first predefined region of the workspace is at a first position when the machine is at first location, and wherein the first predefined region of the workspace is at a second position when the machine is at the second location.

13. The system of claim 10, the safety control system further operable to:

analyze each cluster set to determine whether at least data point within the respective cluster set intersects a first predefined region of the workspace associated with the human or a second predefined region of the workspace associated with the machine;

determine a direction of motion for each of the at least data point intersecting the respective first predefined region or second predefined region; and wherein the safety control system assigns the at least some of the cluster sets as the human cluster or the machine cluster based both on whether at least one data point within the respective cluster set intersects the first predefined region or the second predefined region and the direction of motion of the at least one data point as it intersects the respective first predefined region or the second predefined region.

14. The system of claim 13, wherein the safety control system is further operable to assign the at least some of the cluster sets as the human cluster when the at least one data point intersects the respective first predefined region only along a first direction of motion relative to the workspace, and assign the at least some of the cluster sets as the machine cluster when the at least one data point intersects the respective second predefined region only along a second direction of motion opposite the first direction of motion relative to the workspace.

15. The system of claim 10, the safety control system further operable to:

identify any cluster set for which no data point within the respective cluster set is associated with either the human cluster or the robot cluster based on the first and second predefined descriptors, thereby defining an unknown cluster; and evaluate the unknown cluster based on a predetermined set of instructions; and determine an action by the safety control system based on the evaluation of the unknown cluster.

16. The system of claim 15, wherein the predetermined instructions include a threshold value for a number of data points, the safety control system further operable to:

compare a total number of data points contained within the unknown cluster to the threshold value; and transmit a second safety action signal in response to the safety control system determining that the total number of data points in the unknown cluster exceeds the predetermined threshold value.

17. The system of claim 10, wherein the one or more sensors include laser scanners, three-dimensional time-of-flight cameras, stereo vision cameras, three-dimensional LIDAR sensor or other radar-based sensors.

18. The system of claim 10, wherein the safety control system is further operable to generate an alarm in response to the safety action signal, the system further comprising a machine controller associated with the machine and operable to control one or more movement actions of the machine, the machine controller in operable communication with the safety control system, wherein the machine controller receives the safety action signal from the safety control system and adjusts at least one of the one or more movement actions of the machine responsive to the safety action signal.

19. The system of claim 10, wherein the respective object carried by one or both of the human and the machine includes a workpiece or a tool.

* * * * *